(12) United States Patent
Araujo et al.

(10) Patent No.: US 11,163,878 B2
(45) Date of Patent: *Nov. 2, 2021

(54) INTEGRITY, THEFT PROTECTION AND CYBER DECEPTION USING A DECEPTION-BASED FILESYSTEM

(71) Applicant: International Business Machines Corporation, Armonk, NY (US)

(72) Inventors: Frederico Araujo, White Plains, NY (US); Douglas Lee Schales, Ardsley, NY (US); Marc Philippe Stoecklin, White Plains, NY (US); Teryl Paul Taylor, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,844

(22) Filed: Dec. 18, 2019

(65) Prior Publication Data
US 2021/0117543 A1    Apr. 22, 2021

Related U.S. Application Data

(63) Continuation of application No. 15/691,982, filed on Aug. 31, 2017, now Pat. No. 10,528,733.

(51) Int. Cl.
*G06F 21/56*    (2013.01)
*G06F 21/62*    (2013.01)
(Continued)

(52) U.S. Cl.
CPC ........ *G06F 21/565* (2013.01); *G06F 16/1734* (2019.01); *G06F 21/57* (2013.01);
(Continued)

(58) Field of Classification Search
CPC .. G06F 16/1734; G06F 16/188; G06F 21/565; G06F 21/51; G06F 21/57; G06F 21/577; G06F 21/6218; G06F 2221/034
See application file for complete search history.

(56) References Cited

U.S. PATENT DOCUMENTS 7,197,516 B1 * 3/2007 Hipp ...................... G06F 16/10
7,451,196 B1 * 11/2008 de Vries .................... G06F 8/61
709/220

(Continued)

OTHER PUBLICATIONS

T. Combe, A. Martin and R. Di Pietro, "To Docker or Not to Docker: A Security Perspective," in IEEE Cloud Computing, vol. 3, No. 5, pp. 54-62, Sep.-Oct. 2016, doi: 10.1109/MCC.2016.100. (Year: 2016).*

*Primary Examiner* — Michael Simitoski
(74) *Attorney, Agent, or Firm* — Jeffrey S. LaBaw; David H. Judson

(57) ABSTRACT

A decoy filesystem that curtails data theft and ensures file integrity protection through deception is described. To protect a base filesystem, the approach herein involves transparently creating multiple levels of stacking to enable various protection features, namely, monitoring file accesses, hiding and redacting sensitive files with baits, and injecting decoys onto fake system views that are purveyed to untrusted subjects, all while maintaining a pristine state to legitimate processes. In one implementation, a kernel hotpatch is used to seamlessly integrate the new filesystem module into live and existing environments.

18 Claims, 6 Drawing Sheets

(51) Int. Cl.
  *G06F 21/57*   (2013.01)
  *G06F 16/17*   (2019.01)
  *G06F 21/88*   (2013.01)
  *G06F 21/64*   (2013.01)

(52) U.S. Cl.
  CPC .......... *G06F 21/6218* (2013.01); *G06F 21/64* (2013.01); *G06F 21/88* (2013.01); *G06F 2221/034* (2013.01)

(56) References Cited

U.S. PATENT DOCUMENTS

| | | | |
|---|---|---|---|
| 8,261,345 B2* | 9/2012 | Hitomi | H04L 63/10 726/22 |
| 9,009,829 B2 | 4/2015 | Stolfo et al. | |
| 10,558,818 B2* | 2/2020 | Goyal | G06F 21/6227 |
| 2003/0154221 A1* | 8/2003 | Caronni | G06F 16/148 |
| 2005/0060535 A1 | 3/2005 | Bartas | |
| 2011/0161988 A1* | 6/2011 | Kashyap | G06F 9/544 719/319 |
| 2011/0231370 A1* | 9/2011 | Aurora | G06F 16/188 707/667 |
| 2012/0278439 A1* | 11/2012 | Ahiska | A63F 13/358 709/218 |
| 2013/0219456 A1* | 8/2013 | Sharma | G06F 21/6218 726/1 |
| 2013/0227563 A1* | 8/2013 | McGrath | G06F 8/60 718/1 |
| 2015/0007315 A1* | 1/2015 | Rivera | G06F 21/566 726/23 |
| 2016/0065614 A1 | 3/2016 | Stolfo et al. | |
| 2016/0224785 A1* | 8/2016 | Wagner | G06F 9/45533 |
| 2017/0353496 A1* | 12/2017 | Pai | H04L 63/1416 |
| 2018/0239921 A1* | 8/2018 | Goyal | G06F 21/6227 |
| 2018/0262509 A1* | 9/2018 | Li | G06F 21/51 |
| 2019/0036978 A1* | 1/2019 | Shulman-Peleg | G06F 21/554 |

* cited by examiner

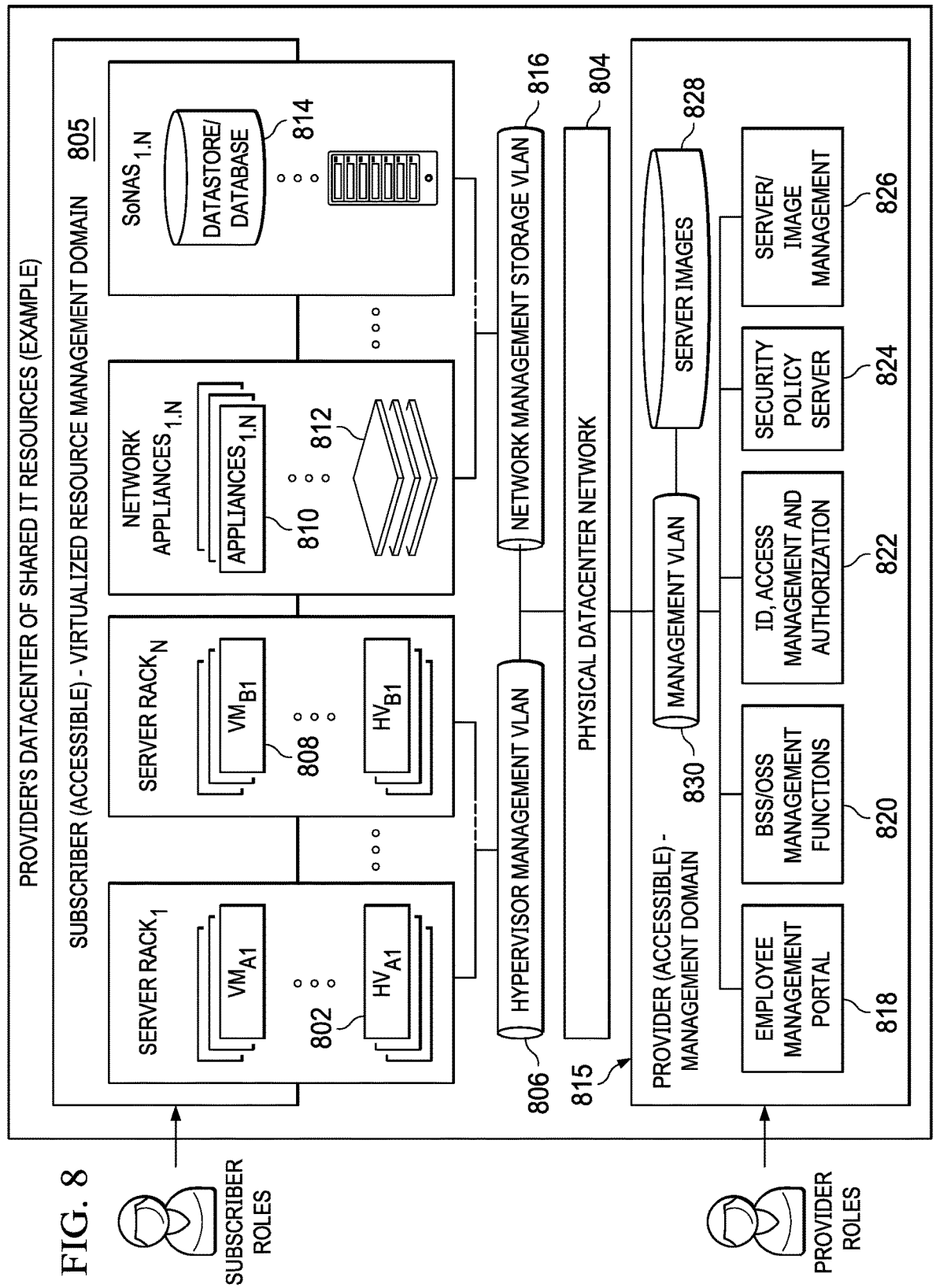

INTEGRITY, THEFT PROTECTION AND CYBER DECEPTION USING A DECEPTION-BASED FILESYSTEM

BACKGROUND

Technical Field

This disclosure relates generally to cyber security.

Background of the Related Art

In today's modern digital age, the compromise or theft of data can have severe consequences on individuals, governments, enterprises, and cloud environments. Capitalizing on data as the new digital currency, cybercrime has become a big money business, with criminals stealing millions of credit card numbers and holding data ransom, costing businesses millions of dollars to regain access to their data. In face of the alarming rate and scope of recent attacks, new approaches are needed to effectively identify and dissuade attackers trying to steal or destroy their targets' crown jewels.

Existing approaches to prevent data theft only work under special circumstances. For example, current ransomware protections focus on preventing malware from running, maintaining backups, or trying to reverse engineer custom cryptography schemes. Unfortunately, such reactive approaches have been proven inadequate, as nearly two-thirds of companies attacked by ransomware still have their files successfully encrypted, with less than half being able to recover from backups.

Other protective measures, such as deceptive files and canaries, alert defenders of an attacker's presence by leaving deceptive breadcrumbs among the legitimate files on a filesystem, which trigger a beacon when they are accessed by any user. To avoid confusing legitimate users, the users must either be aware of the decoys (which is difficult to maintain in shared systems), or the decoys must be identifiable (difficult to prevent attackers from also being able to identify decoys). Unfortunately, such deceptive files do not prevent the attacker from stealing sensitive data.

BRIEF SUMMARY

The subject matter herein provides a new filesystem paradigm, and which protects files at their place of rest. The approach herein provides numerous advantages, namely, stopping theft, preventing modification or destruction of important data by untrusted subjects, (e.g., applications, users, etc.), deceiving adversaries, and detecting the presence of attackers on production systems.

According to an embodiment, a method to protect a base filesystem against attack involves creation of a decoy filesystem that sits atop the base filesystem. To create the decoy filesystem, a set of filesystem overlays are deployed on a per-process basis. Preferably, the filesystem overlays are deployed within mount namespaces associated with an operating system kernel, such as Linux. A process is associated to a particular filesystem overlay upon its creation, and typically according to a trust model. Each process associated to a particular filesystem overlay has a distinct view of the base filesystem that is computed as a union of the base filesystem and contents of the particular filesystem overlay. Once the decoy filesystem is deployed, filesystem access activity is monitored to determine whether a process is trusted. In response to a determination that a process that is not trusted, the contents of a filesystem overlay may then be adjusted to protect the base filesystem from the untrusted process. The contents may be adjusted in various ways, e.g., hiding base files of the base filesystem, modifying content of a base file by overlaying a different file with the same name, and injecting one or more new decoy files that are not present in the base filesystem.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 8 illustrates a cloud computing infrastructure that supports virtualization of resources and in which the described techniques of this disclosure may be implemented.

DETAILED DESCRIPTION OF AN ILLUSTRATIVE EMBODIMENT

Figure 1:
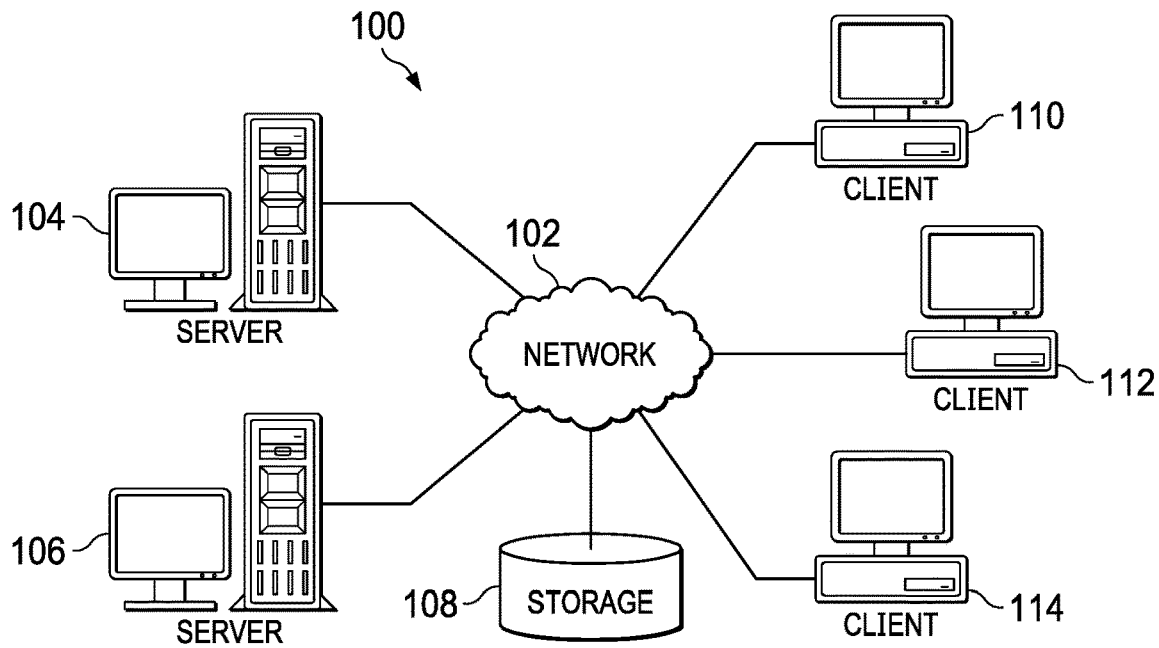
FIG. 1 depicts an exemplary block diagram of a distributed data processing environment in which exemplary aspects of the illustrative embodiments may be implemented.
Figure 2:
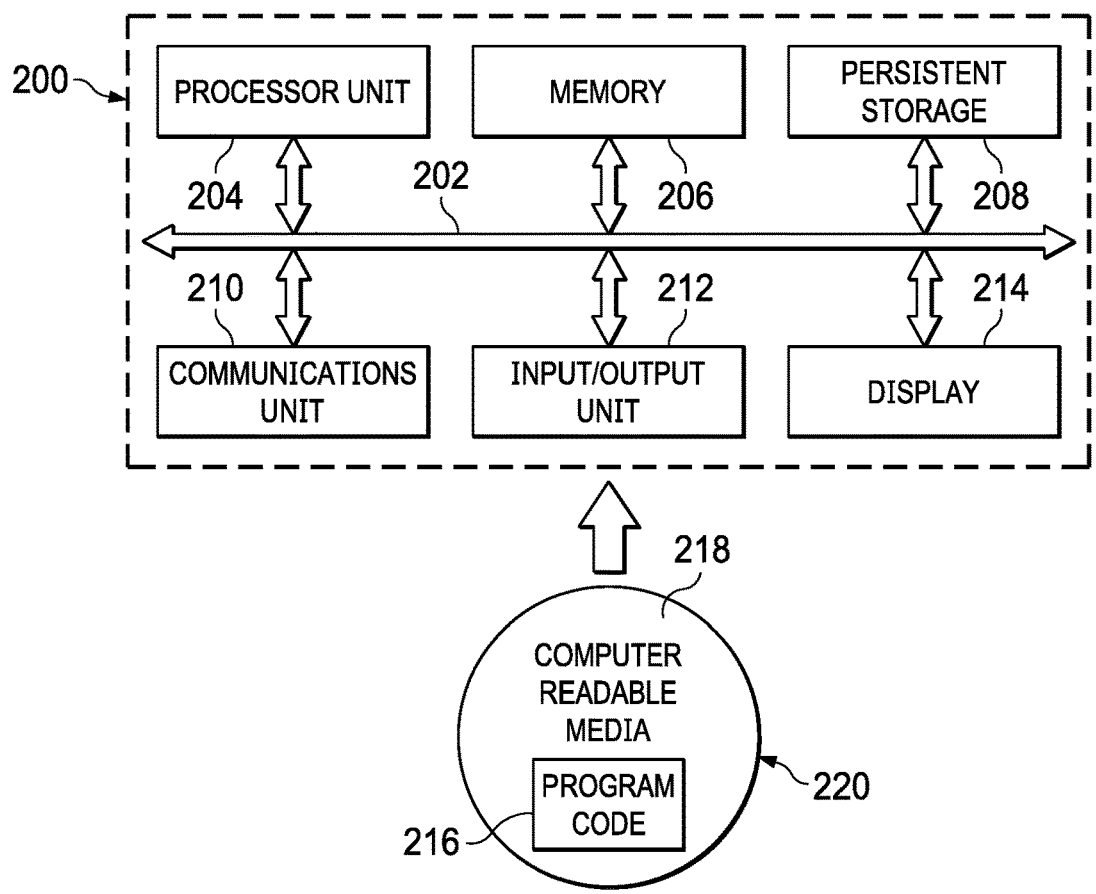
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 106. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 206, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 206 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 206 may take various forms depending on the particular implementation. For example, persistent storage 206 may contain one or more components or devices. For example, persistent storage 206 may be a hard drive, a flash memory, a rewritable optical disk, a rewritable magnetic tape, or some combination of the above. The media used by persistent storage 206 also may be removable. For example, a removable hard drive may be used for persistent storage 206.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 206. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 206.

Program code 216 is located in a functional form on computer-readable media 216 that is selectively removable and may be loaded onto or transferred to data processing system 200 for execution by processor unit 204. Program code 216 and computer-readable media 216 form computer program product 220 in these examples. In one example, computer-readable media 216 may be in a tangible form, such as, for example, an optical or magnetic disc that is inserted or placed into a drive or other device that is part of persistent storage 206 for transfer onto a storage device, such as a hard drive that is part of persistent storage 206. In a tangible form, computer-readable media 216 also may take the form of a persistent storage, such as a hard drive, a thumb drive, or a flash memory that is connected to data processing system 200. The tangible form of computer-readable media 216 is also referred to as computer-recordable storage media. In some instances, computer-recordable media 216 may not be removable.

Alternatively, program code 216 may be transferred to data processing system 200 from computer-readable media 216 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 206, and computer-readable media 216 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF).

By way of additional background, it is known that modern operating systems (including, without limitation, Linux) implement a feature known as "namespaces." A namespace isolates and virtualizes system resources for a collection of processes. In particular, namespaces are a kernel-level feature that wraps a global system resource into an abstraction, such that the process inside the namespace appears to have its own isolated instance of the global system resource. Processes inside a namespace are visible to others inside the same namespace, but they are opaque to processes outside the namespace. The Linux OS kernel provides seven (7) namespaces, each providing isolation for a different operating resource. Some examples of resources that can be virtualized include process IDs, hostnames, user IDs, and the like. One namespace, called cgroup, refers to the Linux kernel functionality called cgroups that allows limitation and prioritization of resources (CPU, memory, block I/O, network, etc.). Another namespace, called mount, refers to the filesystem mount points seen by a process.

It is also known to provide so-called "container" technology that combines the operating system kernel's support of cgroups and namespaces to provide isolated execution environments for applications. Thus, for example, where a host machine executes an operating system (OS), such as the Linux kernel, the operating system provides an OS-level virtualization method for running multiple isolated computing workloads (containers). Typically, a container in this environment hosts one or more applications. By providing a way to create and enter containers, the operating system gives applications the illusion of running on a separate machine while at the same time sharing many of the underlying resources.

Integrity, Theft Protection and Cyber Deception using a Deception-Based Filesystem During a successful cyberattack, an adversary typically installs an application on the defender's system and/or exfiltrates private information. Both of these actions involve interactions with the exploited computer's filesystem. Attackers typically do not know the layout of such filesystems; therefore, they must investigate the various files on the system to identify interesting data to remove. The approach of this disclosure is designed to leverage this need by the attacker (to investigate files) to thereby detect malicious behavior and identify intruders. To this end, and as well be seen, an existing base filesystem is augmented to transparently create one or more levels of stacking to protect the base filesystem and, in particular, by injecting decoy files, monitoring file accesses, and providing per-process views of the filesystem to confuse and identify potential attackers. This stacking provides a decoy filesystem that protects the underlying files in the base filesystem by hiding and redacting of sensitive files with baits, injecting decoys onto fake system "views" that are purveyed to untrusted subjects, and file access monitoring. This cyber deception is carried out while maintaining a pristine state of the filesystem with respect to legitimate processes.

Thus, instead of an approach that merely encouraging attackers to reveal themselves (e.g., by interacting with the filesystem), the technique herein embeds monitoring, decoy files creation, and file systems views separation directly into the filesystem rather than externally or through the files themselves. The resulting filesystem significantly curtails data theft and ensures file integrity protection.

Figure 3:
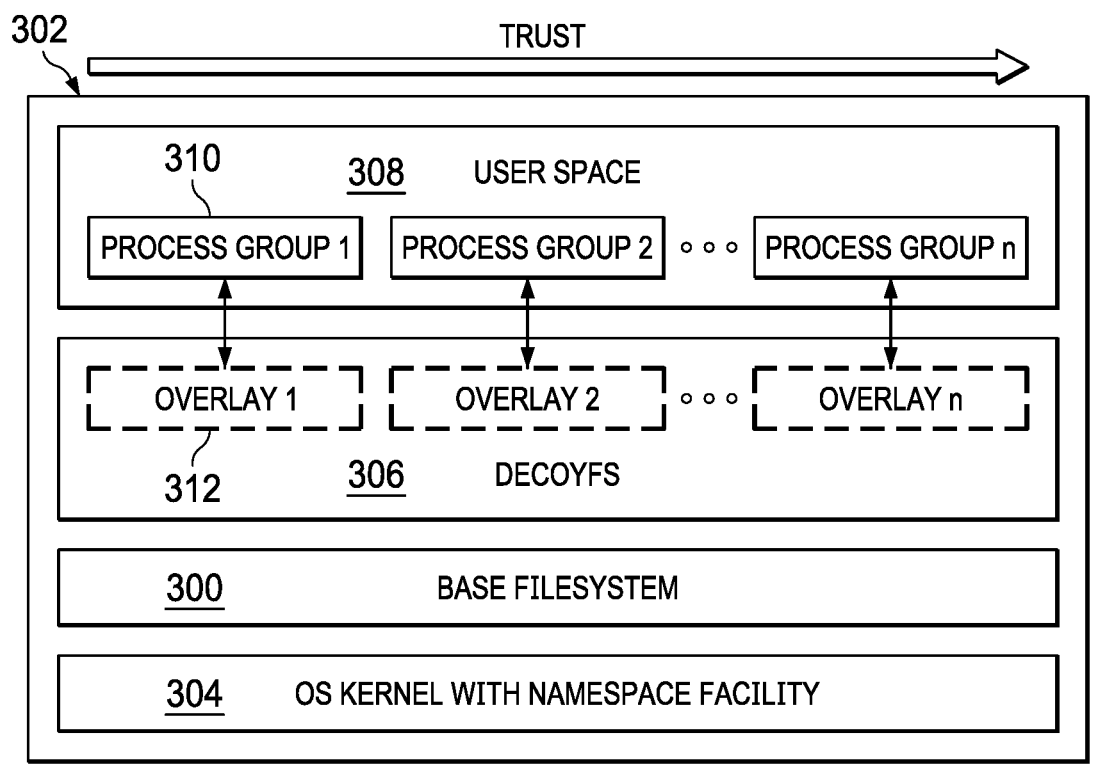
FIG. 3 depicts a decoy filesystem architecture of this disclosure.

FIG. 3 depicts the basic approach of this disclosure. The filesystem being protected is depicted as base filesystem 300, and this filesystem may be of any conventional type, e.g., block-based, network-based, etc. In this example implementation, the filesystem executes in a computing system 302, such as depicted in FIG. 2. The computer system 302 includes an operating system (OS) kernel 304 (e.g., the Linux kernel) that has support for containers and namespaces, such as previously described. According to this disclosure, a decoy filesystem 306 is configured between the base filesystem 300 and user space 308 in which processes in the process groups 310 execute. As will be described, this architecture allows for different directory and file trees to be overlayed (i.e., superimposed) over the base filesystem 300. To this end, and according this disclosure, a set of filesystem overlays 312 are then preferably deployed on a per-process basis, providing each process with a different view of the filesystem. As also depicted, the degree of trust may vary (e.g., by increasing) across the overlays. Thus, "overlay 2" may be seen as more trusted than "overlay 1," etc.

Figure 4:
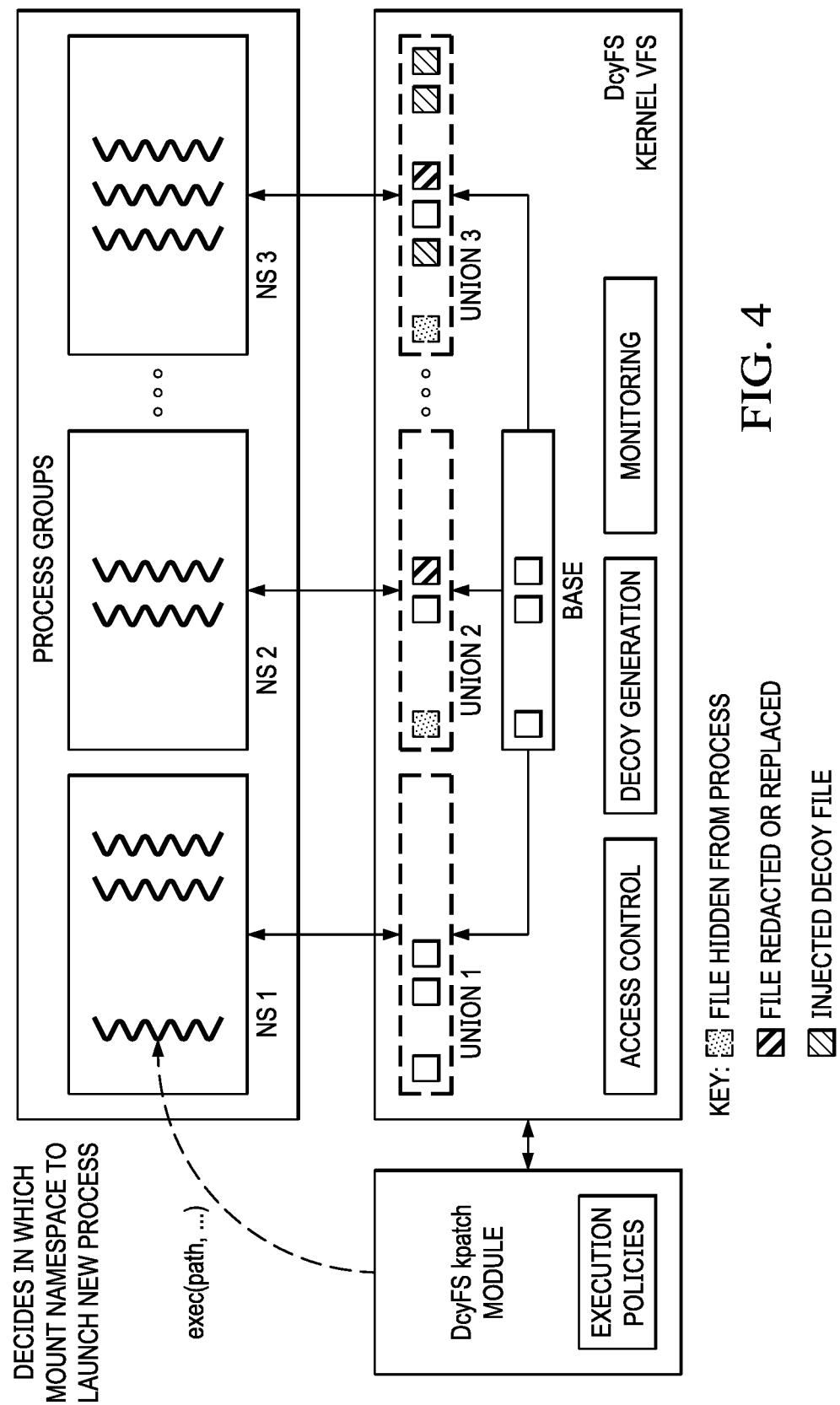
FIG. 4 depicts an implementation of the decoy filesystem using Linux operating system kernel mount namespaces.

FIG. 4 depicts an architectural overview of the decoy filesystem 406 of this disclosure in additional detail. As noted above, the approach herein is to configure a set of filesystem overlays 412 that are preferably deployed on a per-process basis, providing each process with a different view of the filesystem. As depicted, the base filesystem 400 is shown as comprising a set of base files 414, and these base files are mirrored in each of the overlays. Within an overlay, however, and as indicated by the key, a base file may be hidden from a process (represented by hidden file 416), or redacted or replaced (represented by replaced file 418). The key also indicates the notion of a decoy file 420 that may be injected into a particular overlay. As depicted, the "view" presented to a process in a particular overlay may vary and is computed as a "union" of the base filesystem 400 and the overlay 412. To alter the resulting union, and as noted, each overlay 412 thus has the ability to (1) hide base files, (2) modify the content of a base file by overlaying a different file (e.g., one that is redacted or replaced) with the same name, and (3) inject new decoy files that are not present in the host system. Further, file writes are stored in the overlay 412, thereby protecting base files 414 from being overwritten. This approach thus provides for a stackable filesystem that can be mounted atop different base filesystem types (e.g., block-, disk-, network-) to offer data integrity protection and enhanced detection against data-stealing attacks.

As also depicted, the decoy filesystem preferably includes an access control module 420, a decoy generation module 422, and a monitoring module 424. The access control module 420 controls access to the overlays 412 by the processes 426, which execute within one or more namespaces 428 configured in user space 408. As will be described in more detail below, the namespaces 428 are "mount" namespaces. The decoy generation module 422 generates encrypted files and implants the decoys in the overlay to replace sensitive files in the base filesystem. The monitoring module 424 transparently monitors and logs access to the files. Based on this monitoring, the system can determine whether a process 426 is trusted. Preferably, and then using the access control module 420, only an untrusted process is affected by the hidden and decoy files, leaving legitimate users free of confusion.

To effectively and securely construct filesystem overlays, and as referenced above, the decoy filesystem 406 preferably leverages an operating system kernel mount namespace 428 and, in particular, to pivot the base filesystem in the namespace to a specially-crafted union mount. The mount namespace is a Linux operating system construct that provides an isolated mount point list for every process residing in a particular namespace; thus, a process inside the namespace observes a different filesystem than the base system. According to a preferred implementation, processes are moved, upon creation, into a mount namespace based on some notion of trust. Preferably, a decoy filesystem kernel patch module is used for this purpose. In one embodiment, a simple trust model that may be used for this purpose is based on white/black listing. The trust model maps a user name, binary hash, or process name to a set of configurations describing an overlay. Preferably, the configuration also specifies which files and directories to show in the overlay, which ones to hide, and which ones to replace with another file. Using the access control module 420, trusted processes are then presented with a pristine (unaltered) view of the filesystem.

In particular, and too achieve transparency and minimize performance overhead, a preferred Linux-based implementation leverages a kernel modification deployed as a kernel hot patch 430 (patching the kernel while it is running), and the installation of a kernel module 432 implementing the monitoring, access control, and decoy creation and injection capabilities. As depicted in FIG. 4, the hot patch 430 modifies the kernel's exec family of functions 434 to drop newly-created processes into a new mount namespace protected by the decoy filesystem. The particular overlay is chosen based on the trust model. Note that child processes automatically inherit their parent namespace, unless otherwise specified by the trust model.

Figure 5:
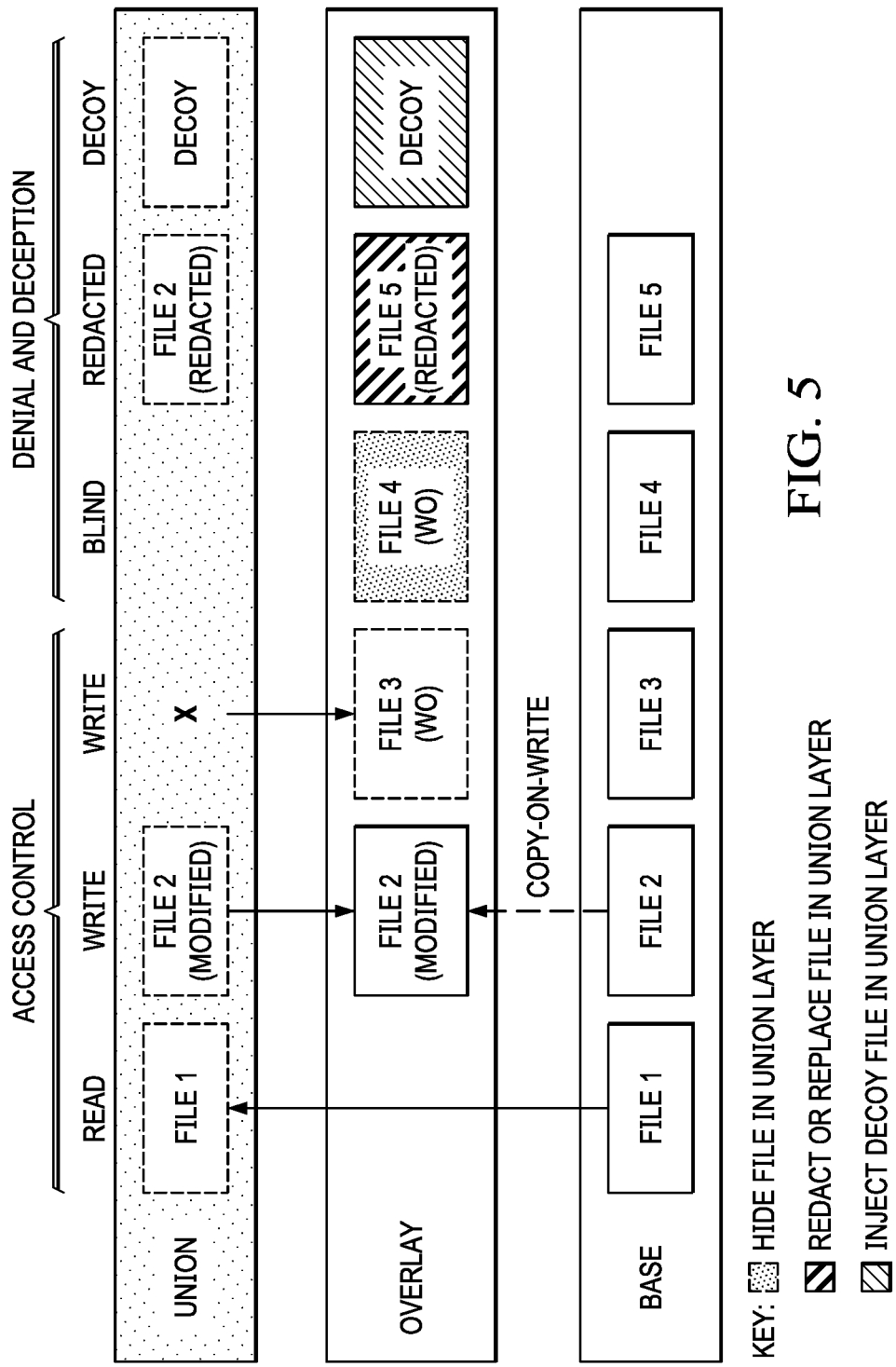
FIG. 5 depicts how the decoy filesystem implements access control, and various denial and deception techniques to protect files in the base filesystem.

Further details of a preferred decoy filesystem implementation are shown in FIG. 5. In the illustrative embodiment, the decoy filesystem is implemented using the Linux operating system OverlayFS union filesystem, which creates an upper mount and a lower mount. In this context, the lower mount is the base filesystem, and the upper mount is the overlay. FIG. 5 depicts this concept, showing the base 500 and overlay 502 mounts, and the resulting union 504 of the two mounts that serves as the namespace's pivot. The base filesystem in this example includes a set of base files (file 1 through file 5), and the various protection features provided by the decoy filesystem are shown by of example. Thus, the access control module operation is shown with respect to various read/write operations on base files 1, 2 and 3. Base file 1 is made available in the union for read; base file 2 is stored in the overlay in a modified form such that a write from the union does not impact the base file; and base file 3 is marked as deleted in the overlay so that it cannot be written. The denial and deception function is depicted by example with respect to base files 4 and 5. Thus, base file 4 is hidden in the overlay and thus not available in the union; base file 5 is redacted or replaced in the overlay and thus only made available in the redacted form in the union. An additional decoy file 516 is also provided in the overlay and is thus visible in the union, but this decoy does not correspond to any base file.

Thus, and as these non-limiting examples demonstrate, there are several techniques that are preferably implemented by the decoy filesystem. To hide a base file or directory, the decoy filesystem simply marks it as deleted in the overlay. Decoy files are similarly placed in carefully-chosen locations inside the upper mount, and existing files can be replaced or redacted for attacker deception as previously noted. Changes made by processes determined to be untrusted do not affect the base filesystem, thereby protecting legitimate users from seeing malicious changes as well as effectively keeping an uncorrupted copy of the filesystem immediately before the malicious process started. The decoy filesystem hides particular files and directories from a process, thus curtailing sensitive data leaks. When necessary, the decoy filesystem generates encrypted files and implants decoys in the overlay to replace sensitive files in the base filesystem.

An example Linux implementation uses Ubuntu 16.04 LTS, leveraging VFS (Virtual File System) and its mount namespace implementation. This implementation is advantageous as it provides for a stacking filesystem to augment standard filesystems with the desired denial and deception capabilities (namely, hiding resources from untrusted processes, redacting or replacing assets to protect sensitive data, and injecting breadcrumbs to dis-inform and misdirect attackers). The VFS module enables transparent and easy integration with legacy environments. Further, the filesystem can be easily installed without system restart by using the kernel hot-patch to configure it into the existing production environment. While the above implementation is preferred, it is not intended to be limiting. Recently, Windows Server 2016 was released with native namespace support and an overlay filesystem driver, mirroring its open-source counterpart. The above-described approach may be implemented therein, or other modern operating system environments that support namespace-type constructs.

Figure 6:
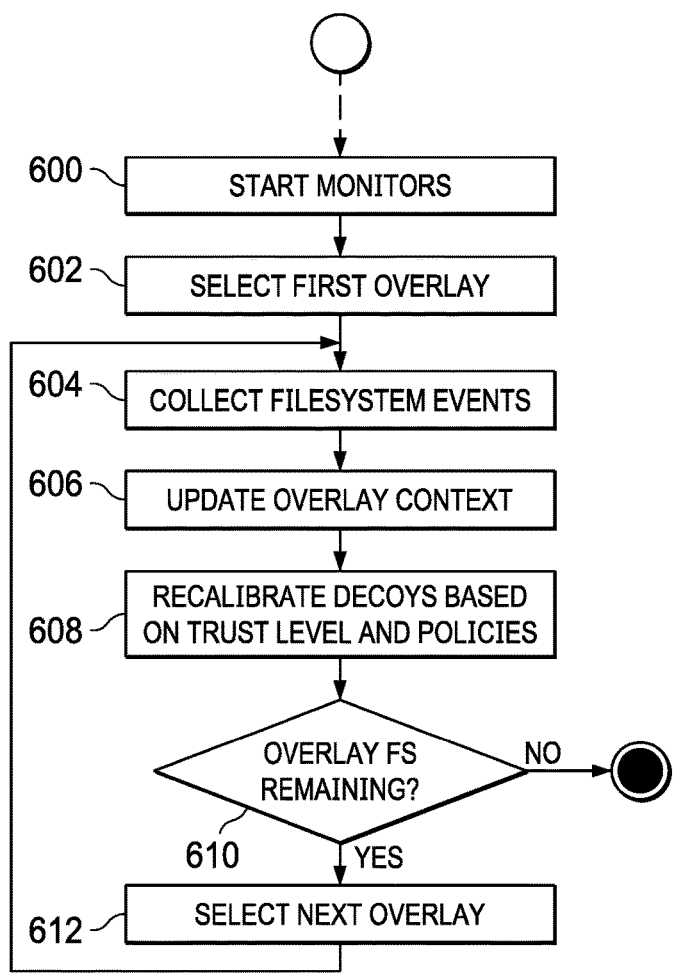
FIG. 6 is a process flow depicting how the decoy filesystem strategically overlays deceptive objects atop the base filesystem.
Figure 7:
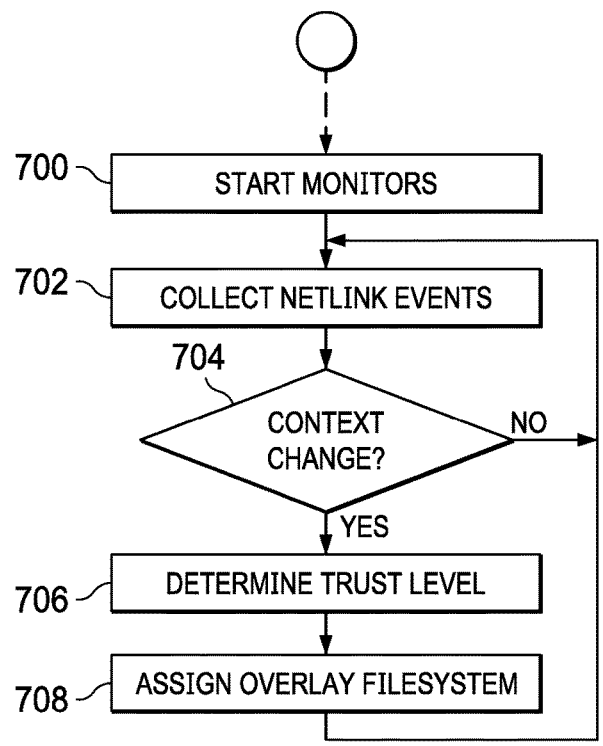
FIG. 7 is a process flow depicting how the decoy filesystem creates a targeted filesystem "view" that is assigned to an overlay.

The various operations of the decoy filesystem may be implemented in software executed in one or more hardware processors, typically as a set of processes. FIGS. 6 and 7 depict several such control processes that are now described.

FIG. 6 is a process flow depicting how the decoy filesystem strategically positions deceptive objects (decoys) atop the base filesystem. At step 600, the monitors (one for each overlay) are started. At step 602, a first overlay is selected. Filesystem events are then collected at step 604 for the selected first overlay. At step 606, the routine updates an overlay "context" for the overlay being monitored. At step 608, decoys are then recalibrated (i.e., strategically-positioned) based on the existing trust level and, optionally, one or more policies. At step 610, a test is made to determine whether additional overlays need to be monitored. If so, the routine branches to step 612 to select a next overlay for monitoring. Control then returns to step 604. When all of the overlays have been processed, the outcome of the test at step 610 is negative and the decoy deployment process ends.

FIG. 7 is a process flow depicting how the decoy filesystem creates targeted filesystem "views," e.g., that hide hide-value resources and expose breadcrumbs to detect deliberate tampering with filesystem data. To this end, the decoy filesystem actively captures filesystem events and correlates them with other system features (e.g., user, process name, time, etc.) to create the views. Thus, the process begins at step 700 by starting the monitors. At step 702, netlink events are collected. The netlink socket family is a Linux kernel interface used for inter-process communication (IPC) between both the kernel and user space processes, and between different user space processes. Using the information collected, a test is performed at step 704 to determine whether a context change has occurred. If not, the routine cycles. If, however, the outcome of the test at step 704 indicates a context change, the routine continues at step 706 to determine the trust level. At step 706, a new "view" is created and assigned to an overlay in the decoy filesystem. Control then returns to step 702 to complete the process.

The decoy filesystem provides effective data theft protection and deception. As is well-known, a typical social engineering attack usually starts with a spear phishing email containing a malicious attachment. When the recipient (e.g., a government official whose machine is protected with the filesystem herein) clicks on the attachment, a remote access terminal (RAT) is transparently installed. Because the RAT is untrusted, however, it is immediately given its own view of the decoy filesystem, wherein as noted above sensitive files are hidden, or masked by fake versions. For example, the attacker gets to see a fake or redacted spreadsheet, while the original is safe from the attacker's view. Another use case provides for effective ransomware detection. In particular, because the decoy filesystem prevents processes from making changes to the host filesystem (integrity protection), it is an effective defense against ransomware. Because each untrusted program preferably is run in a separate overlay, the system can readily identify which overlay has encrypted files to know which executable might be ransomware.

The decoy filesystem technique herein provides significant advantages, namely, stopping theft, preventing modification or destruction of important data by untrusted subjects, (e.g., applications, users, etc.), deceiving adversaries, and detecting the presence of attackers on production systems. It provides for a new filesystem paradigm, and which protects files effectively at their place of rest. As has been described, the solution takes a fundamentally different approach to the data theft and integrity problem, namely, by providing a decoy filesystem that monitors file accesses transparently, hides sensitive data, creates decoy files, and modifies existing files to provide to untrusted subjects (e.g., processes and users) a fake system view. The filesystem actively captures filesystem events and correlates them with other system features (e.g., user, process name, time) to create targeted filesystem views that hide high-value assets and expose enticing breadcrumbs to detect deliberate tampering with filesystem data. Such context-awareness minimizes false alarms by curtailing inadvertent, legitimate access to breadcrumbs, by exposing more "truthful" views of the filesystem to trustworthy processes, all the while maximizing chances of attack detection by strategically overlaying deceptive objects atop the base filesystem.

The approach detects and resists real ransomware attacks, and it defends against data theft and filesystem tampering without incurring significant overhead. Unlike prior work, the approach enforces file integrity protection without requiring file access mediation. It also supports the implementation of access control policies, and it enables the automation of decoy injection in commodity filesystems.

In addition, the approach enables the construction of realistic, but completely false, views of the filesystem to be presented to untrusted processes. To a process running in an overlay, it appears that it is able to view, extract, and modify real data. It may be viewing decoy files or missing sensitive files, however, and its file modifications will not be seen outside its overlay. As has been described, this operation is done transparently, without advertising itself to the untrusted process, and without affecting other legitimate processes. Further, and to make decoy files both less visible to trusted users and more visible to attackers, the decoy filesystem actively moves decoys into place for untrusted programs. This means that decoys can be stored out of the way of trusted users (e.g., in a hidden directory), as well as being visible in normal locations for untrusted programs.

The nature of the trust model that is enforced by the decoy filesystem may vary. As noted in the above example, a typical trust model is rule-based, e.g., using basic white/black listing. As a variant, this trust model may take into account which user is executing the program, how that user is authenticated, and past behaviors of the user and the process to determine its trustworthiness. A trust model based in part on crowd-sourced data may also be implemented.

Preferably, and as described above, the changes made by untrusted processes are currently only visible to that process and disappear on reboot. In situations where an untrusted process should become trusted, such as being vouched for by a more-trusted subject, those changes may be copied from the overlay and merged into the real filesystem. Further, the approach herein supports decoy files that are created manually. As another variant, the decoy filesystem may create decoy files automatically based on different formats, such as data that appears to be encrypted, or files containing fake keys or passwords. The system may also be configured to learn the content of overlays based on past process behaviors to streamline overlay generation.

As has been described, the approach herein preferably is implemented as an overlay to an existing filesystem, and thus there is no need to have access to the actual filesystem itself. As noted, the technique instead leverages the notion of a filesystem namespace to implement the decoy filesystem, and these types of namespaces are available in modern operating systems such as Linux, Windows Server 2016, and the like. Further, by using a kernel module to hook in and make decisions on where (i.e., which namespace) to place a newly-forked process (e.g., based on trust), the approach may be used with any such operating system, even without access to the actual operating system source code.

The techniques herein may be used with a host machine such as shown in FIG. 2 (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Typical cloud computing service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Typical deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

FIG. 6 illustrates a typical Information Technology (IT) infrastructure that supports virtualization of resources and in which the described techniques of this disclosure may be implemented. In this example, the IT datacenter that provides shared (public) resources is the "provider" and a customer or company that uses these shared resources to host, store and manage its data and applications (in all forms) is the "subscriber" (or "customer" or "tenant"). In FIG. 6, an example virtual machine hosting environment (alternately referred to herein as a data center or "cloud") is illustrated. This environment comprises host machines (HVs) 602 (e.g., servers or like physical machine computing devices) connected to a physical datacenter network 604, typically via a hypervisor management VLAN 606. Although not depicted explicitly, typically the environment also includes load balancers, network data switches (e.g., top-of-rack switches), firewalls, and the like. As shown in FIG. 6, physical servers 602 are each adapted to dynamically provide one or more virtual machines (VMs) 606 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 610 are hosted in network appliances 612, and tenant data is stored in data stores and databases 614. The applications and data stores are connected to the physical datacenter network 604, typically via a network management/storage VLAN 607. Collectively, the virtual machines, applications and tenant data represent a subscriber-accessible virtualized resource management domain 605. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 615. This domain comprises a provider employee management portal 616, business support services (BSS) and operational support services (OSS) management functions 620, various identity and access management functions 622, a security policy server 624, and management functions 626 to manage the server images 626. These functions interface to the physical datacenter network via a management VLAN 630.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. In a non-limiting implementation, representative platform technologies are, without limitation, IBM System x® servers with VMware vSphere 4.1 Update 1 and 5.0.

As previously noted, the above-described components typically are each implemented as software, i.e., as a set of computer program instructions executed in one or more hardware processors. As has been described, the components are shown as distinct, but as noted this is not a requirement, as the components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates the above-described infrastructure. It may be available as a managed service, e.g., provided by a cloud service.

The components may implement any process flow (or operations thereof) synchronously or asynchronously, continuously and/or periodically.

The approach may be integrated with other enterprise- or network-based security methods and systems, such as in a STEM, or the like.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Aspects of this disclosure may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the deception router system is implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While a process flow above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The nomenclature used herein also should not be taken to be limiting.

The techniques improve conventional computing systems by providing a filesystem that curtails data theft and ensures file integrity protection through deception. Existing computing technologies are improved by providing a decoy filesystem that monitors file accesses transparently, hides sensitive data, creates decoy files, and modifies existing files to provide to untrusted subjects (e.g., processes and users) a fake system view. Computing systems that incorporate the techniques herein provide these advantages transparently and without disruption, thereby increasing the reliability and availability of the underlying filesystem. Further, computer systems implemented with the approach herein operate more efficiently and with less cyber security-specific processing and storage requirements than they would otherwise.

Having described the subject matter, what we claim is as follows:

1. A method to protect a base filesystem against attack, comprising:
    deploying particular filesystem overlays in association with distinct processes, wherein a process associated to a particular filesystem overlay has a distinct view of the base filesystem that is computed as a union of the base filesystem and contents of the particular filesystem overlay, and wherein a degree of trust varies across the particular filesystem overlays;
    monitoring filesystem access activity to determine whether a process is trusted; and
    responsive to a determination that a process is not trusted, adjusting the contents of a filesystem overlay to protect the base filesystem from the untrusted process.

2. The method as described in claim 1 wherein adjusting the contents of a filesystem overlay includes one of: hiding base files of the base filesystem, modifying content of a base file by overlaying a different file with the same name, and injecting one or more new decoy files that are not present in the base filesystem.

3. The method as described in claim 1 wherein the filesystem overlays are deployed within mount namespaces associated with an operating system kernel.

4. The method as described in claim 3 further including assigning a process upon creation into a mount namespace according to a trust model.

5. The method as described in claim 1 wherein a process that is determined to be trusted is afforded full access to the base filesystem.

6. The method as described in claim 1 wherein monitoring filesystem access activity intercepts filesystem events to monitor file accesses.

7. An apparatus to protect a base filesystem against attack, comprising:
    a processor;
    computer memory holding computer program instructions executed by the processor, the computer program instructions configured to:
        deploy particular filesystem overlays in association with distinct processes, wherein a process associated to a particular filesystem overlay has a distinct view of the base filesystem that is computed as a union of the base filesystem and contents of the particular filesystem overlay, and wherein a degree of trust varies across the particular filesystem overlays;
        monitor filesystem access activity to determine whether a process is trusted; and
        responsive to a determination that a process is not trusted, adjust the contents of a filesystem overlay to protect the base filesystem from the untrusted process.

8. The apparatus as described in claim 7 wherein the computer program instructions configured to adjust the contents of a filesystem overlay perform one of: hiding base files of the base filesystem, modifying content of a base file by overlaying a different file with the same name, and injecting one or more new decoy files that are not present in the base filesystem.

9. The apparatus as described in claim 7 wherein the filesystem overlays are deployed within mount namespaces associated with an operating system kernel.

10. The apparatus as described in claim 9 wherein the computer program instructions are further configured to assign a process upon creation into a mount namespace according to a trust model.

11. The apparatus as described in claim 7 wherein a process that is determined to be trusted is afforded full access to the base filesystem.

12. The apparatus as described in claim 7 the computer program instructions that monitor filesystem access activity include computer program instructions configured to intercept filesystem events to monitor file accesses.

13. A computer program product in a non-transitory computer readable medium, the computer program product holding computer program instructions to protect a base filesystem from attack, the computer program instructions comprising program code configured to:
    deploy particular filesystem overlays in association with distinct processes, wherein a process associated to a particular filesystem overlay has a distinct view of the base filesystem that is computed as a union of the base filesystem and contents of the particular filesystem overlay, and wherein a degree of trust varies across the particular filesystem overlays;
    monitor filesystem access activity to determine whether a process is trusted; and
    responsive to a determination that a process is not trusted, adjust the contents of a filesystem overlay to protect the base filesystem from the untrusted process.

14. The computer program product as described in claim 13 wherein the computer program instructions configured to adjust the contents of a filesystem overlay perform one of: hiding base files of the base filesystem, modifying content of a base file by overlaying a different file with the same name, and injecting one or more new decoy files that are not present in the base filesystem.

15. The computer program product as described in claim 13 wherein the filesystem overlays are deployed within mount namespaces associated with an operating system kernel.

16. The computer program product as described in claim 15 wherein the computer program instructions are further configured to assign a process upon creation into a mount namespace according to a trust model.

17. The computer program product as described in claim 13 wherein a process that is determined to be trusted is afforded full access to the base filesystem.

18. The computer program product as described in claim 13 the computer program instructions that monitor filesystem access activity include computer program instructions configured to intercept filesystem events to monitor file accesses.

\* \* \* \* \*